Figure 1:
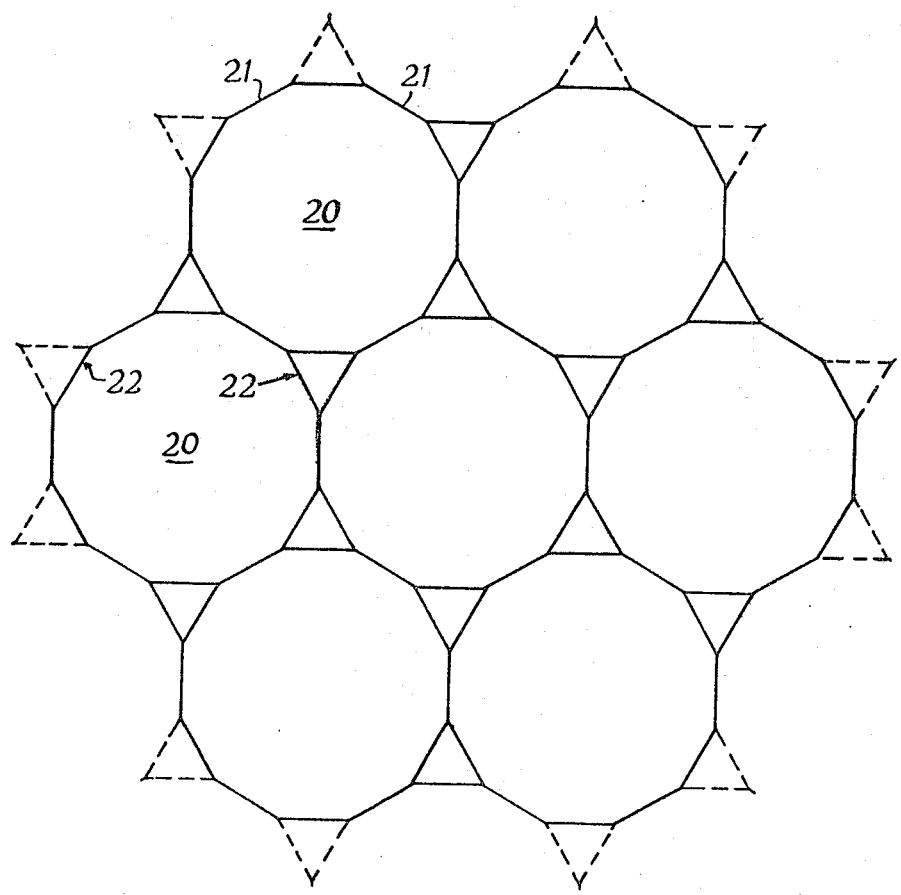

May 14, 1968     J. D. WILSON ETAL     3,382,633
SILOS

Filed Oct. 7, 1964     13 Sheets-Sheet 1

May 14, 1968  J. D. WILSON ETAL  3,382,633
SILOS

Filed Oct. 7, 1964  13 Sheets-Sheet 2

INVENTORS
John Derek Wilson
William John Barchain
Alexander Stewart MacCaig
BY
Alexander Howell
ATTORNEYS

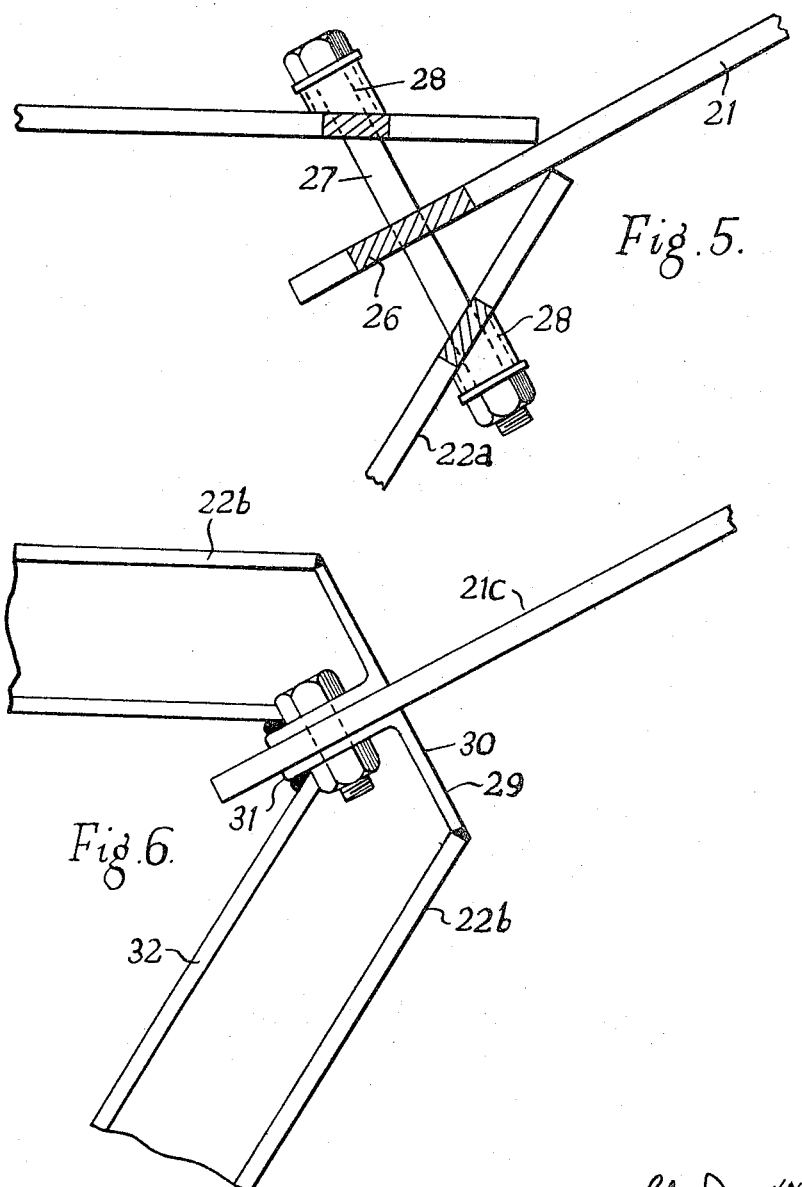

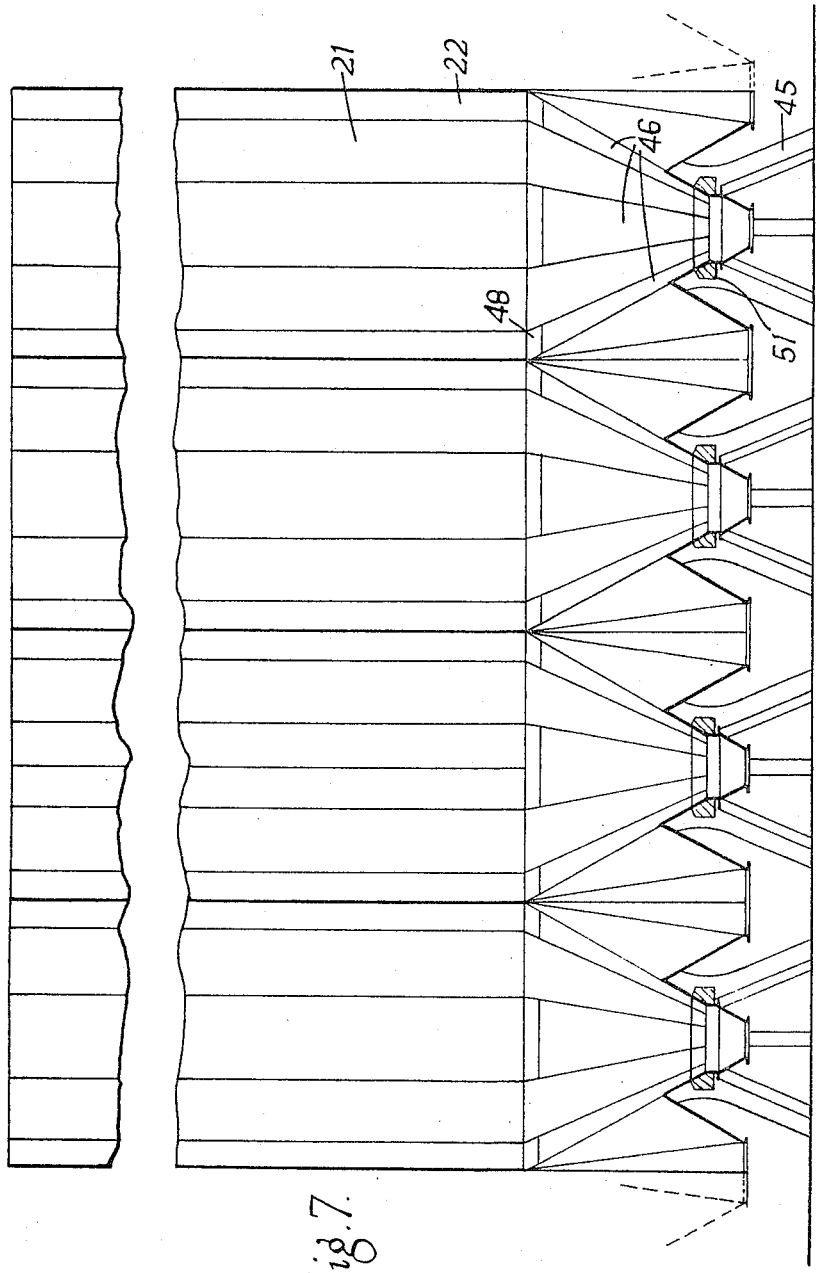

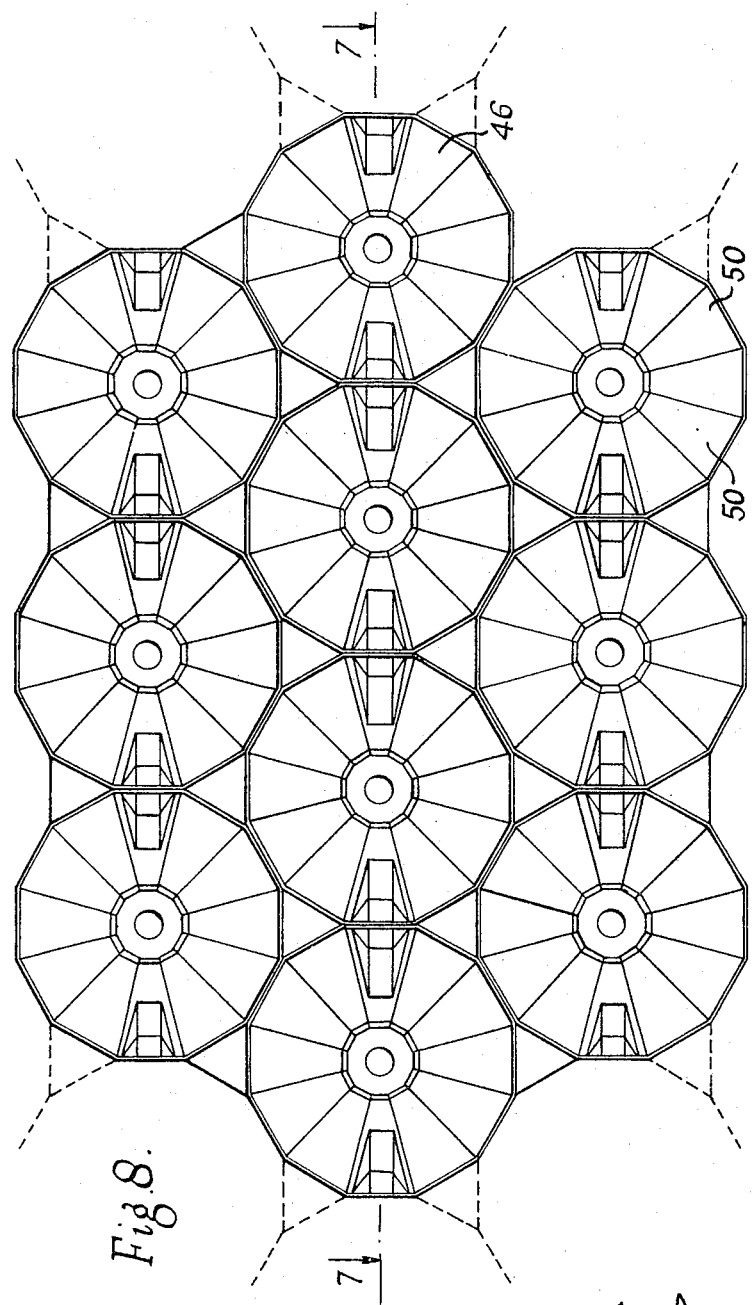

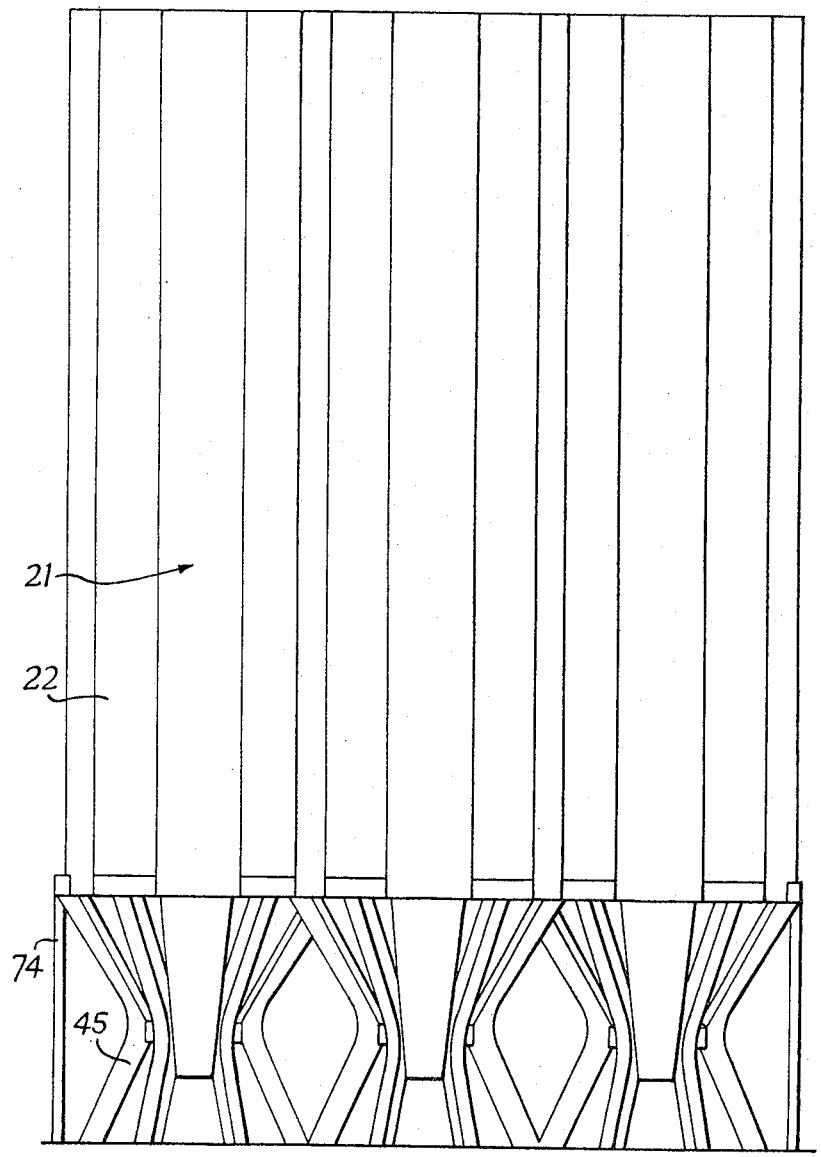

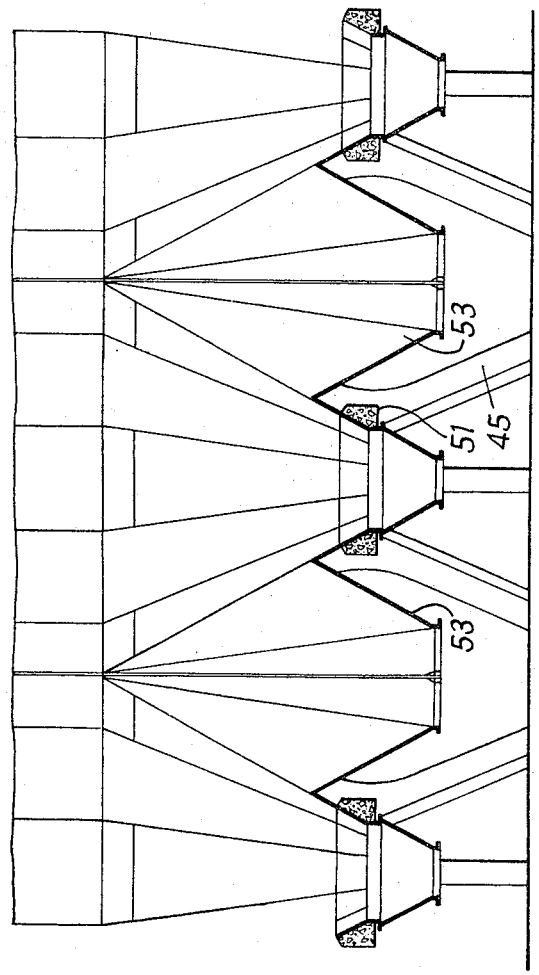

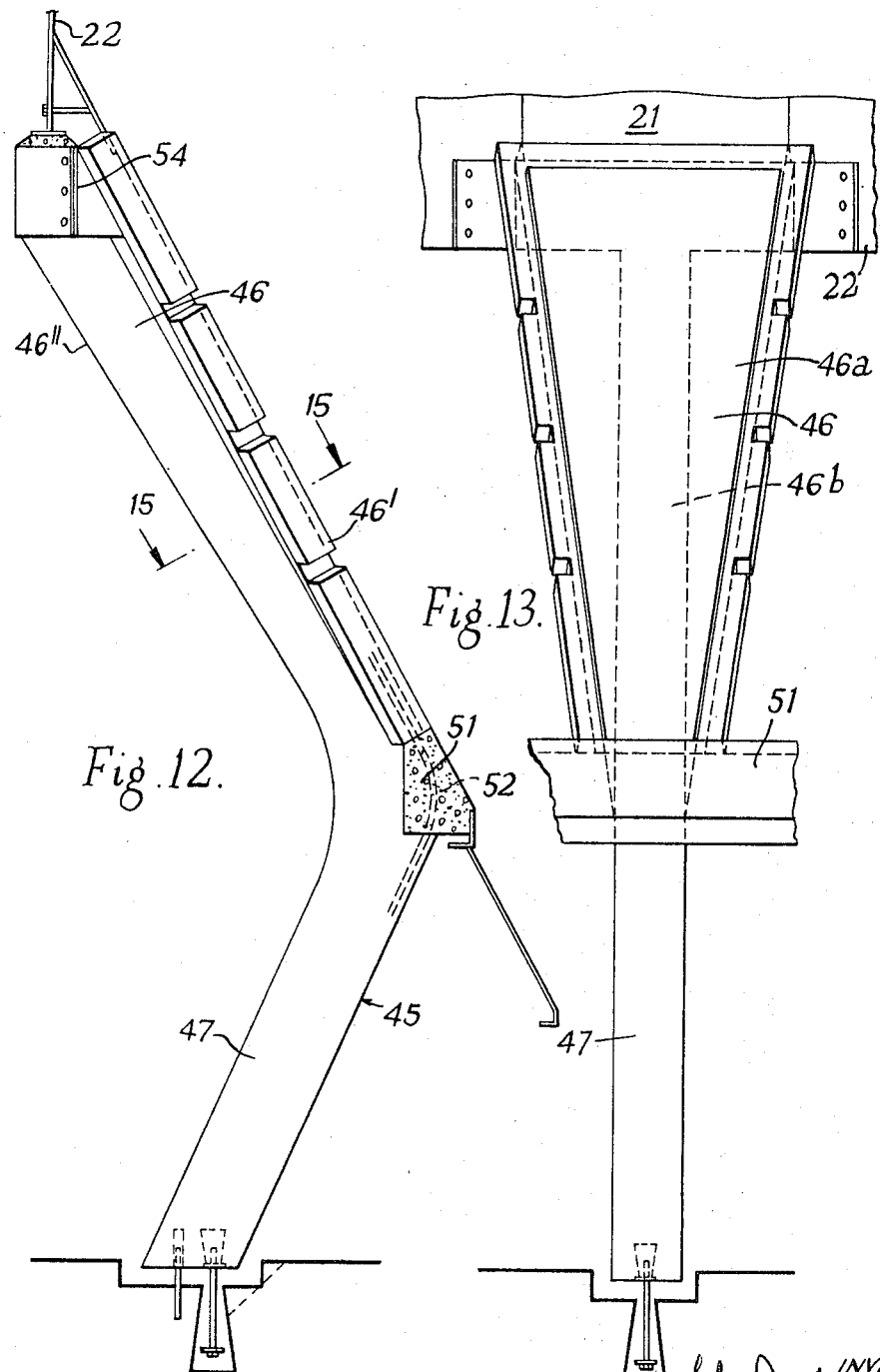

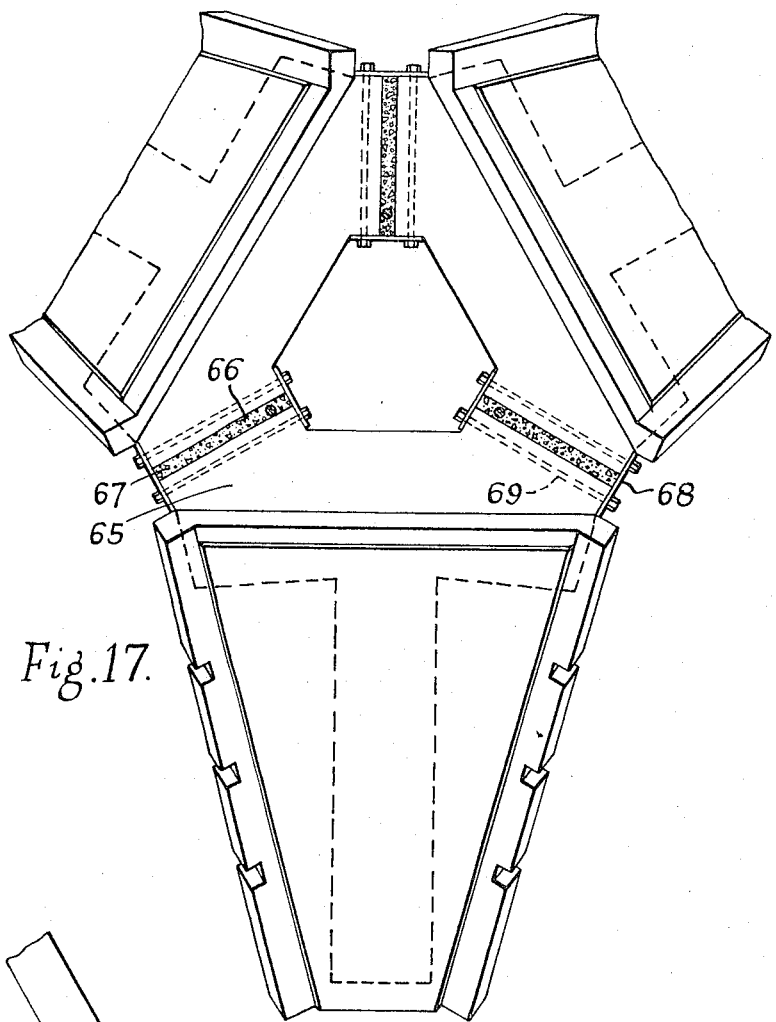
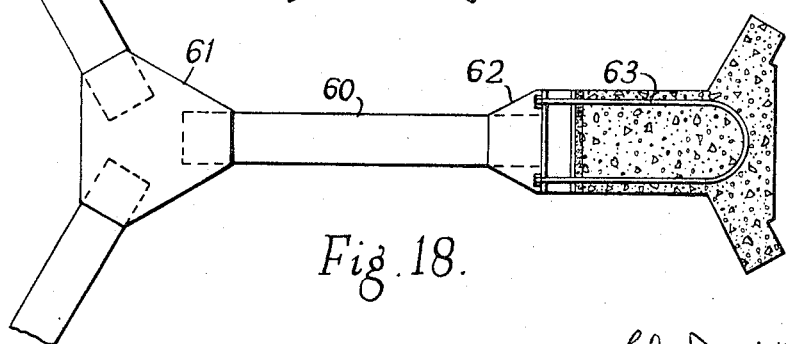

May 14, 1968 J. D. WILSON ETAL 3,382,633
SILOS
Filed Oct. 7, 1964 13 Sheets-Sheet 13

INVENTORS:
John Derek Wilson
William John Barcham
Alexander Stewart MacCaig
By Alexander Howell
attorneys

United States Patent Office 3,382,633
Patented May 14, 1968

3,382,633
SILOS
John Derek Wilson, William John Barcham, and Alexander Stewart MacCraig, Clifton, Bristol, England, assignors to Duodec Development & Construction Company Limited, Bristol, England
Filed Oct. 7, 1964, Ser. No. 402,209
Claims priority, application Great Britain, Oct. 14, 1963, 40,443/63, 40,444/63
12 Claims. (Cl. 52—237)

This invention relates to silos for the storage of materials in bulk and particularly, but not solely, to silos comprising a plurality of vertically disposed storage cells or bins suitable for containing various organic or inorganic materials in either granular, powdered or other particulate form.

The tendency in industry throughout the world is developing towards the storage in bulk of a greater proportions of industrial, edible, and agricultural materials. Many such materials have been traditionally stored in bags, and are now being stored in bulk. They demonstrate to a greater degree the known problems in the storage and handling of other materials traditionally stored in bulk. The resurgence of these problems has demanded that fresh consideration be given to the matter of silo design and as a result there has been more research and investigation into the nature of material containment and flow with results indicating specific forms of construction which could only be achieved at the expense of economy, and in other instances where economy has been the principal aim, this has only been achieved at the expense of efficiency in the containment and movement of the stored materials. The silo's cells having a circular in cross section are well known and can be constructed in steel with a smooth interior. However, the manufacture of curved plates and their subsequent fixing on side is relatively expensive compared with the basic cost of the steel, and the spaces between the circular cells are of an awkward shape for any real usefulness. Square, or rectangular shaped cells are also frequently adopted but the horizontal span of the walls in practical dimensions has led to the need for the walls themselves to be corrugated for strength against bending, or for internal ties to be fitted. Such features, while having little effect upon the flow of smooth, granular materials can promote arching in the powdered materials to such a marked degree that flow must be frequently encouraged by some form of mechanical vibration or agitation. Smooth, flat steel plates, where adopted in rectangular cell construction without internal ties have proved, without question, to be far too thick to be at all economical.

It has been known also for silos to be constructed with cells having polygonal shapes. However, such construction, while sometimes showing economy in the cost of walls, loses the advantage when a supporting structure and hopper bottoms are required. Then it is generally necessary to construct a heavy concrete slab and supporting columns.

In the pursuit after economy it has been known for silos to be constructed with simple flat bottoms at ground level and for the contained material to be extracted from the bin cells by mechanical auger or similar equipment. In other instances the contained materials are allowed to form their own natural sloping faces which has meant a loss in cell volume of a certain proportion of the material contained. While this is acceptable for the containment and handling of certain materials it is essential for others that bottoms be provided to the cells which are self emptying. Such bottoms usually take the form of inverted cones or pyramids, with central openings for discharging the contents of the cell. Due to the strong tendency for many materials to arch over the opening this is not in many instances the best method of discharge. Experiments in recent years have shown that the flow of materials during discharge from a cell can be generally greatly improved if the flow takes place towards the side of the cell. In most silos which have hopper bottoms supported from a grid of beams at entablature level, there is the horizontal projection of the supporting beam to be overcome during the flow of material down the vertical side. This is a serious impediment to the otherwise improved flow and has been removed in certain silo designs only at greatly increased cost. It has been known for other materials to be stored and handled more efficiently when they are in a refrigerated condition. For this reason schemes have been put forward for refrigerating materials when contained in bulk in silos, and again at increased cost. It is generally agreed among silo designers and users that during the flow of materials from a cell there is differential movement within the cell which results in abrasion. This is a highly undesirable condition particularly with such materials as coal, and pelletted, friable materials. For this reason further experiment and investigation has been carried out with a view to unloading silo cells without the differential movement of materials within. The system devised to achieve this object is generally termed as the method of "chimney" discharge. The principle in this method is to provide ducts either within or constructed outside of the silo cell and into which the contained materials overflow from the top while at a lower level the material is prevented from flowing into the duct by the natural horizontal arching effect set up within itself about the duct opening. Clearly this facility where provided can only be done at greatly increased cost beyond that of the normal, traditional silo cell.

An object of the present invention is to provide the storage bins with smooth interiors to promote a steady flow of contained material and substantially reduce the tendency of the material to arch.

Further objects of the invention are to incorporate the known desirable features in silo design as given above. Certain details of the construction vary to suit the specific features required in each individual design but the basic arrangement provides for them all to be simply incorporated with very little alteration to the fundamental competitive cost.

According to the invention we provide a silo having at least one cell comprising a plurality of plates connected together to form the side walls of the cell, the plane containing one plate of each pair of adjacent connected plates cutting the plane of the plate adjacent said one plate at a marginal portion thereof which extends beyond the edge of said one plate and forms an acute angle therewith.

The plates may be connected together by welding in which case an edge of one plate of each pair of adjacent connected plates abuts the side of the plate adjacent said one plate at a distance from the edge thereof. A rod may be welded along the angular recess formed by the extending marginal portion and the marginal portion of said one plate or this recess may be closed by a rectangular strip.

Alternatively, the plates may be bolted together, in which case one leg of a steel angle member may be welded to the edge of one plate of each pair of adjacent connected plates while the other leg of said angle member is bolted flat with the extending marginal portion of the plate adjacent said one plate. The silo constructed in accordance with the invention may be of the single celled type or may comprise a plurality of cells either separate from each other or nested together.

Figure 2:
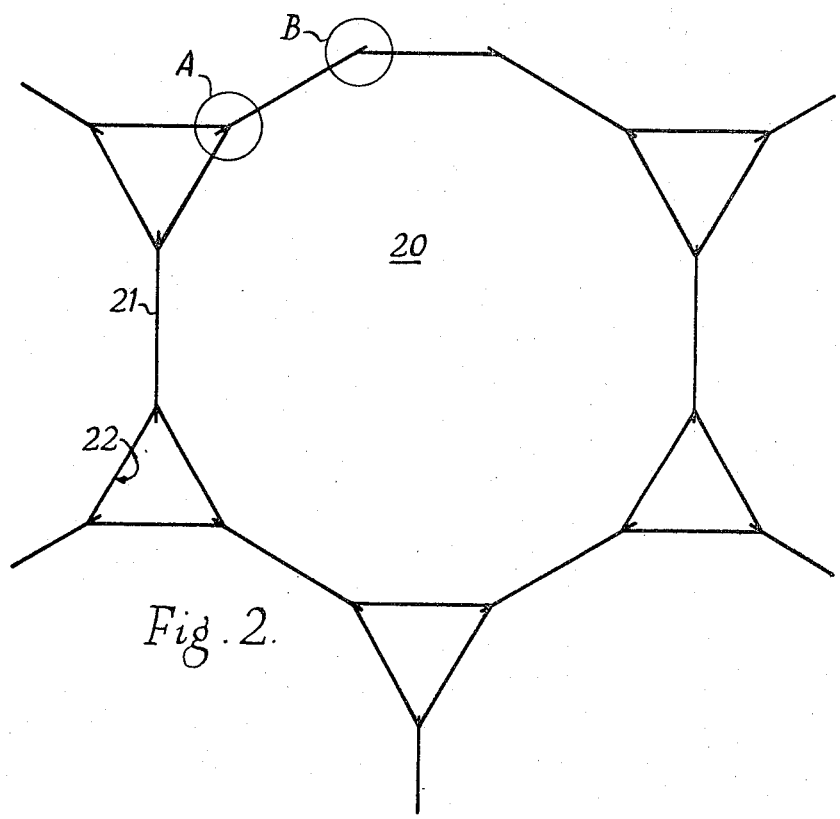
Figures 3, 4:
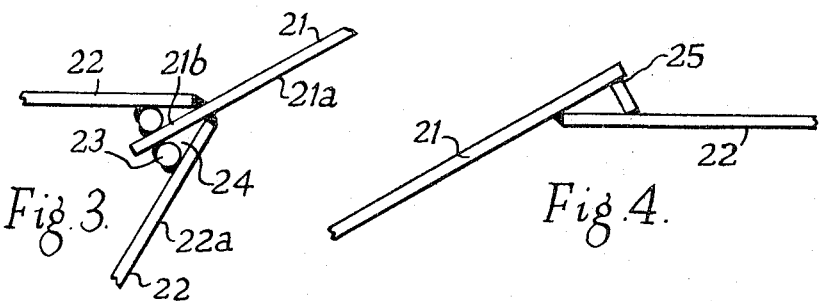
Figure 10:
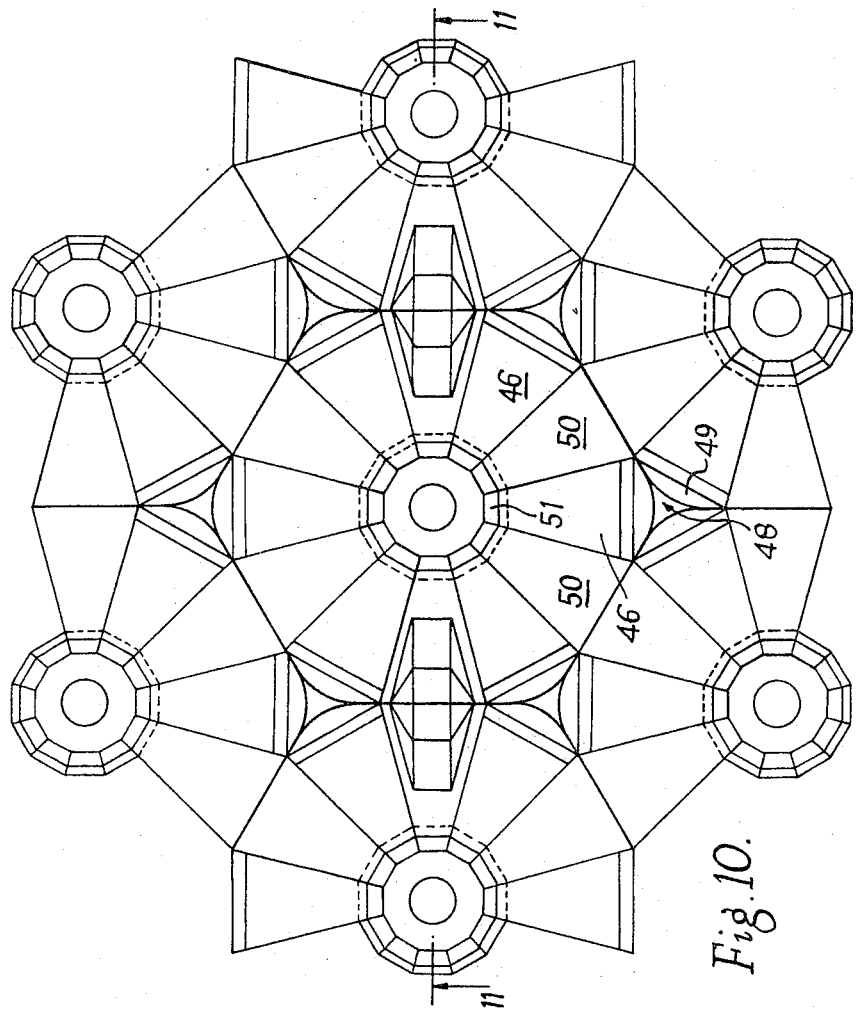
Figure 14:
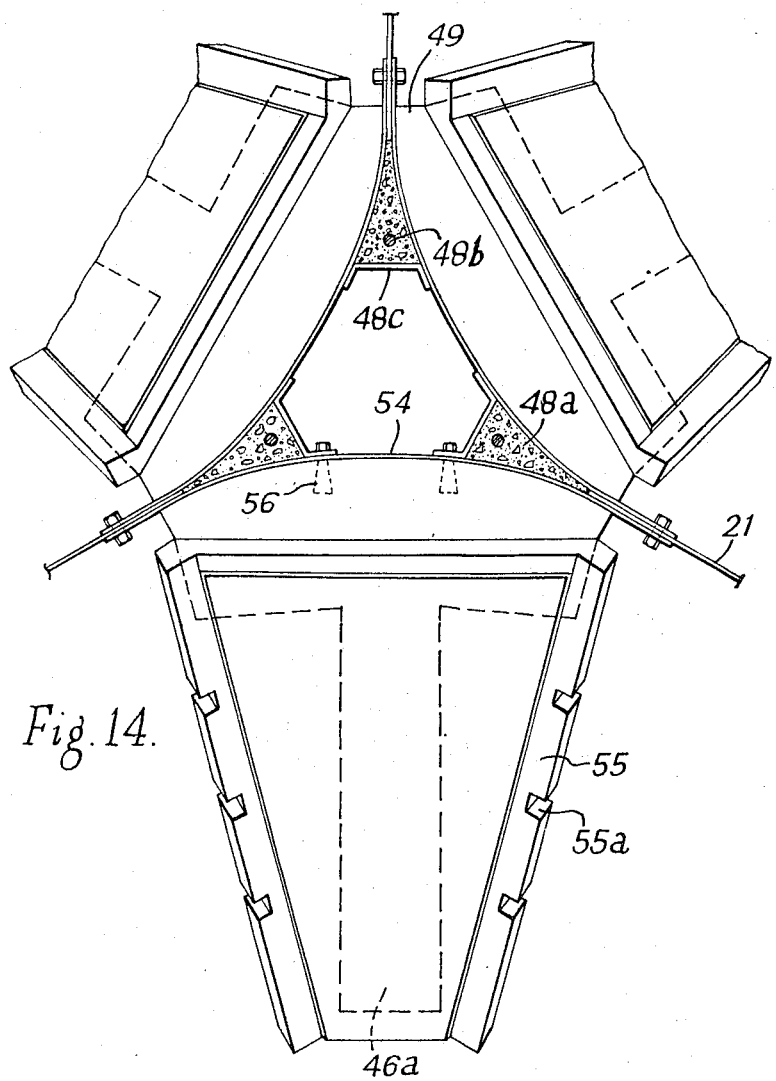
Figure 15:
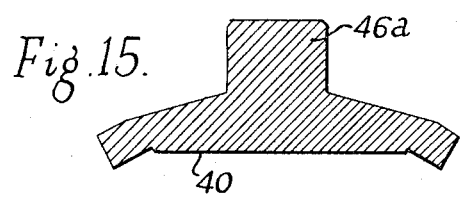
Figure 16:
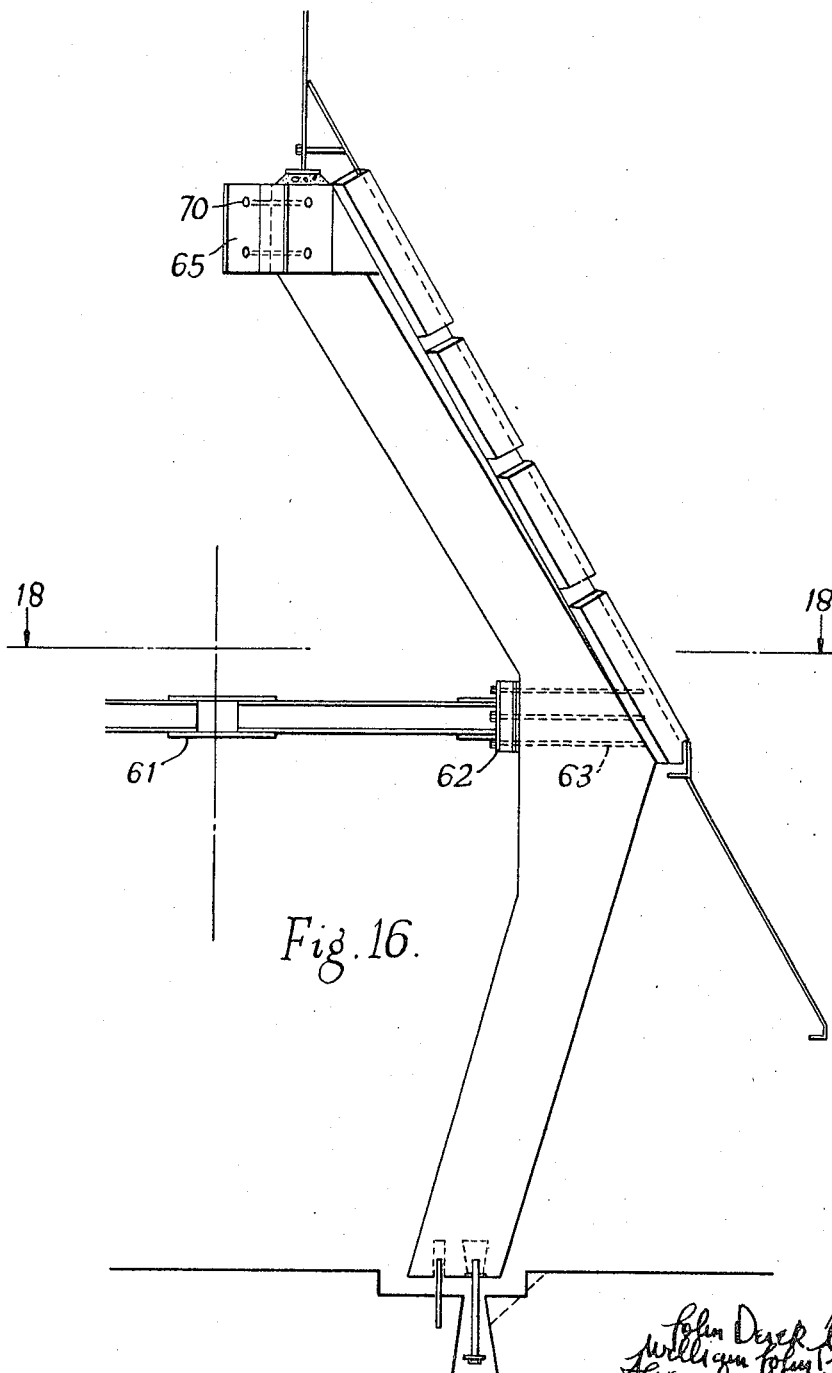
Figure 19:
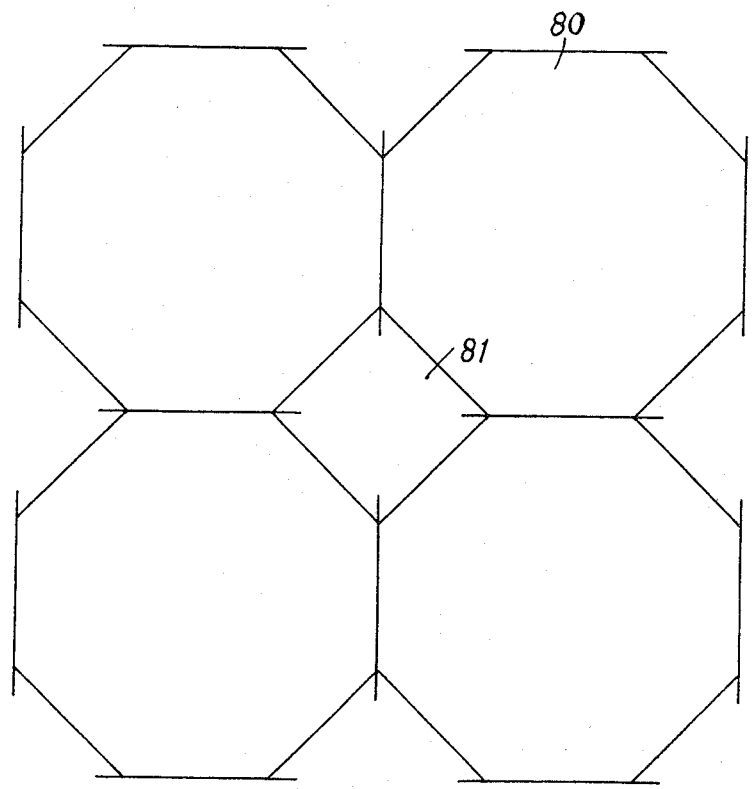

Constructional forms of the invention will now be described by way of examples with reference to the accompanying drawings in which:

FIGURE 1 is a schematic plan on part of a multi-celled silo having cells of duodecagonal configuration, FIGURE 2 is a schematic plan view of one of said cells and parts of adjacent cells on an enlarged scale, FIGURE 3 is a plan view, enlarged still further, on the intersection of three adjacent plates at the point indicated by reference A in FIGURE 2, FIGURE 4 is a plan view on the intersection of two adjacent outside plates at the point indicated by reference B in FIGURE 2, FIGURE 5 is a plan view on the intersection of the three adjacent plates at the point indicated by reference A in FIGURE 2 prior to welding, FIGURE 6 is a plan view on the intersection of the three adjacent plates at the point indicated by reference A in FIGURE 2 showing an alternative method of connecting the plates together, FIGURE 7 is a section taken along the line 7—7 of FIGURE 8 showing the general arrangement of part of the multi-celled silo having cells of duodecagonal configuration, FIGURE 8 is a plan view of part of said silo, FIGURE 9 is an end elevation, FIGURE 10 is a part plan view of entablature level on a larger scale than the view in FIGURE 8 and showing side outlets to the cell bottoms, FIGURE 11 is a section taken along the line 11—11 in FIGURE 10, FIGURE 12 is an enlarged side elevation of a reinforced concrete supporting unit and a thrust ring and side wall plate in position, FIGURE 13 is a front elevation of the supporting unit and other parts shown in FIGURE 10, FIGURE 14 is a part plan view at entablature level showing the upper ends of three supporting units and fixings for the side wall plates, FIGURE 15 is a section taken along the line 15—15 in FIGURE 12, FIGURE 16 is a side elevation of an alternative construction of a reinforced concrete supporting unit, FIGURE 17 is a part plan view at entablature level, and FIGURE 18 is a section taken along the line 18—18 of FIGURE 16, showing ties connected between three supporting units, and FIGURE 19 is a further schematic plan on part of a multi-celled silo having cells of octagonal configuration.

A silo of steel and concrete construction comprises a plurality of cells 20 nesting with each other in the manner of a honeycomb. Each cell is formed by twelve vertical steel plates 21 of substantially identical width connected together in a substantially equilateral duodecagonal configuration, as shown in FIGURE 1. The plates may be welded together on site or may be bolted together in a manner described below and to provide the means of a further system of evacuating the cells in which case openings would be provided in the cell walls forming the triangle. They also provide a basic construction which may be simply adapted to permit refrigeration or ventilation.

The cells are constructed so that any two adjacent cells are separated by a common side plate and the nesting of the cells of duodecagonal form results in a triangular sectioned space occurring at each juncture of three adjacent cells. The triangular space is of sufficient size to enable a workman to enter.

In the welded construction the side plates may be of the same width or may be in two basic widths, one slightly wider than the other as shown in FIGURE 2. In the construction of FIGURE 3, in which three plates are shown welded together, an edge of one plate 22 of the adjacent plates abuts the side of the other plate 21 and the two plates welded so that the plane of plate 22 cuts the plane of plate 21 at a marginal portion 21a thereof which extends beyond the edge of the plate 22 and forms an acute angle of 30° therewith. A rod 23 is welded along the angled recess 24 formed by the extending marginal portion 21b and the marginal portion 22a of plate 22. Both plates 22 are also welded to plate 21 in a similar manner.

The plates may be connected in an alternative manner as shown in FIGURE 4. However, in this case the method is particularly suitable for connecting the plates of the outside walls of the silo, or the plates of a single celled silo. The plates are connected together as in FIGURE 3 but instead of a rod the recess is closed by a rectangular cover strip 25 which completes the small triangle at the connection of the plates.

The welding of the rod or strip within the triangular sectioned space need be only sufficiently strong to hold it in position where it acts as a fulcrum to the adjacent plates when they are subject to horizontal bending. Stitch welding here is sufficient. The weld connecting the plates on the inside of the cell must be continuous but requires to be only of sufficient strength to prevent the separation of the plates since virtually no bending stresses occur at this weld due to the rod or strip acting as the fulcrum.

By connecting the plates in either of the described welding methods the plates may be supplied direct from the steel mills at the normal mill tolerances and without any special edge preparation. The methods of connection allow for wide tolerances in plate widths.

The marginal portions of the two adjacent plates together with the rod or rectangular strip form in effect a column of substantially triangular cross-section. In this manner the advantage is also achieved in that the strengthening members necessary to support the sides of the cells are substantially provided by the plates themselves with the subsequent reduction in the cost of construction.

FIGURE 5 refers to FIGURE 3 and shows a junction between the three plates. The detail shown indicates the method of securing the plates together prior to site welding. Slotted holes 26 are provided in the plates (e.g. at approximately 4 ft. vertical centres) such that ample tolerance is provided, and bolts 27 with tapered ferrules 28 are fitted into these slots and drawn up tight to clamp the plates together. In this manner the silo walls may be erected to a suitable height prior to the site welding operation. The bolts also provide fixing points for erection staging. As the welding of the inside of the silo walls proceeds on site the bolts are removed by the erector and the slots plug welded.

An alternative method of connecting three cell wall plates together by bolting instead of by welding is shown in FIGURE 6.

The plates 21c which are common to two adjacent cells are simply rectangular plates having a series of bolt holes provided along their vertical marginal portions. Six of these rectangular plates are provided to each cell. The other plates which form both the sides of the cells between the rectangular plates, and the sides 22b of the triangular spaces are also rectangular plates but are additionally prefabricated with inturned flanges 29 along their vertical edges.

These flanges 29 each comprise a steel angle section member welded to the plate 22b with the connected side 30 set at an angle of 120° to the plane of the plate. The outstanding side 31 is provided with a series of bolt holes which coincide with the series of bolt holes in the rectangular plate.

When the cells are assembled, three flanged rectangular plates 22b are brought into close proximity with each other to form a box-like structure having a triangular cross-section. The adjacent outstanding sides 31 of the flanges at each corner of the triangle, which sides are parallel to each other, are engaged one on each side of the vertical marginal portion of a rectangular plate 21c and bolts are passed through both the said second outstanding sides and the rectangular plate, the latter being sandwiched between the second adjacent outstanding sides.

Suitable stiffening is provided to the plates 22b in the form of T-sectioned members 32 which also serve adequately to restrain the bursting force existing horizontally in the plates when the cells are full.

In this manner the cells are assembled with all the connecting bolts and nuts within the triangular spaces so that no projection occurs within the cells which remain with smooth interior surfaces.

Instead of a duodecagonal configuration a number of octagonal cells 80 may form part of a multi-celled silo (see FIGURE 19). The connection between the plates forming the walls of the cells is as for the duodecagonal cells except for the angle of inclination of the walls to each other. Such a silo offers a greater number of smaller cells with square interstitial spaces 81 between the cells which may also be used if required as smaller cells. Such an arrangement of small cells is suitable for silo users whose manufacturing processes require certain blending operations of several basic materials.

Cells constructed in the above ways may be supported at entablature level on the ground or on precast support members such as shown in FIGURES 7–11.

In the latter case the arrangement of duodecagonal or octagonal cells is put to a distinct advantage by causing the triangular spaces or squares to act as columns and to be supported at their base at entablature level by precast reinforced concrete units which perform the dual function of supporting the silo and forming part of the hopper bottoms. Thus, the silo is virtually supported upon its own bottoms without any isolated columns or entablature beam network or slab.

The bottom of each cell is in the form of an inverted, truncated hollow pyramid having twelve inclined internal surfaces, the vertical cell walls 21 and 22 being supported on top of the pyramid forming the cell bottom.

Preferably six of the inclined surfaces of the cell bottom are formed by the upper inclined portions 46 of identical support members 45 which are arranged equally spaced apart on a pitch circle. Since the cells are nested together and each cell is supported by six support members, the latter are in effect grouped together in threes in the manner of tripods. The three upper adjacent ends 48 of the support members 45 are formed to fit together and provide horizontal ledges 49 (FIG. 10) on which rest the vertical sides of the triangular sectioned spaces. The lower portion 47 (FIG. 12) of each support member 45 is inclined in the opposite sense to that of the upper portion. The lower portions are connected directly to the foundation slab of the silo, and thus the support members act as substitutes for any columns which would otherwise be necessary to support the silo from the foundation slab. The upper portion 46 of the support members themselves provide the bottom surface of the cell at least in part. The remaining tapering spaces between the upper inclined portions 46 of the support members are closed by steel infill plates 50 which engage in recesses 55 (FIG. 14) and which thereby complete the inverted pyramidal cell bottom. The infill plates are secured in position by simple toggle bolts which are located in notches 55a.

The main weight of the silo is supported at these ledges 49 by the support units coming together at these places and the tendency towards horizontal movement at the centre of the cell is prevented by the construction of an insitu reinforced concrete thrust ring 51 (FIGS. 10–11–12) which connects the lower portions 47 of the precast concrete units. The concrete is cast around steel rod reinforcements 52 which is part of the main reinforcement of the precast concrete support unit 45.

To the lower ends of the upper inclined portions 45 at the outlet of the cell is attached a steel cone having a closure member (not shown). Side outlets 53 (FIG. 11) may be provided as an alternative to steel plates 50 between the inclined portions 46. By providing these side outlets the contained material may be permitted to flow freely in a vertical direction without having to pass over any horizontal projection whatsoever. The side outlet is constructed to fit between the precast concrete support units in exactly the same manner as the plain infill plate 50 which otherwise occupies the space. Each cell may be fitted with up to six such side outlets so that considerable flexibility is provided for in the arrangement of the discharging plant below.

FIGURES 12, 13, 14 and 15 show in greater detail the construction of the precast concrete support units 45.

Each support member is formed of reinforced concrete and is shaped in the following manner:

The lower portion 47, extending from the ground or foundation to a position about one half of the overall height of the member, comprises a column of rectangular cross-section having parallel sides. The lower portion is inclined to the vertical at an angle of from 20 to 30 degrees, preferably 25 degrees.

The lower portion is surmounted by an upper inclined portion 46, formed integrally with the lower portion. The upper portion is inclined to the vertical in the opposite sense to that of the lower portion, at an angle of from 30 to 50 degrees, preferably 30 degrees. This inclined portion comprises a slab of concrete 46a slightly increasing in thickness from the top to bottom and a width tapering in decreasing dimension from the top downwards. The upper surface of the slab is in the form of a truncated wedge shape and serves as part of the cell bottom.

The slab is strengthened and supported by a rib 46b which extends along the under surface, the rib being an extension of the lower portion 47 and of the same thickness as the latter. The slab and ribs have a cross-section as shown in FIGURE 15.

It may be seen that the thrust ring 51 offers resistance to horizontal movement of the unit at the lower outlet level and horizontal movement at entablature level is prevented by the mutual restraint offered by the connected precast concrete units. In addition a further restraint against horizontal movement at entablature level is provided by the introduction of an arcuate steel strip 54 (FIGS. 12 and 14) which is cast with the concrete unit and connected to the plates which are common to adjacent cells and thus forms around each cell a restraining girdle. The upper surface of the unit is constructed in the fashion of a wedge (see FIGURE 14) which occupies a section of the cell bottom. When the units are erected there remains only to fill the spaces between them at entablature level 48 with concrete 48a (FIG. 14) and to fit anchor bolts 48b to complete the construction of the bottom. These spaces between the support units are formed by the steel strips 54 and the flange-stiffened steel plates 48c which form connectors and are fitted to the precast concrete units by simple cast-in sockets 56. It may be seen in this detail that there is no column or grid network of beams at entablature level and this offers the opportunity for the introduction of the side outlets 53 to the cell bottoms.

FIGURES 16, 17 and 18 show alternative details for the construction of the precast concrete unit described in FIGURES 12, 13, 14 and 15. The in situ concrete thrust ring 51 at outlet level is omitted and its restraining effect provided by steel ties 60 which connect the three support units which form a tripod support at each triangular space. The ties 60 are connected at the juncture of the two portions of the support member and shown in FIGURE 16 as in section in FIGURE 18. At entablature level, which is the top of the precast concrete unit, the steel girdle 54 is omitted and the unit is shaped to permit the simple bolted assembly of three-unit tripods and the subsequent sealing of the joint openings with concrete 67 placed in situ.

The ties 60 are connected to a connecting member 61 with the ties displaced 120° from each other and to the support members by means of brackets 62 secured by means of U bolts 63 embedded in the support members during casting.

The upper end of the inclined portion 46 is provided with a horizontal supporting element 65 having a substantially truncated wedge shaped upper surface and vertical side faces 66 inclined to each other at 120°. This angle is selected in order that the vertical side faces 66 can come into close proximity with the side faces of adjacent upper ends of the other supporting members with sealing concrete 67 between them.

The support members are held together with clamping plates 68 and bolts 69 passing through preformed holes 70 in the supporting element 65.

The interstitial triangular spaces are supported directly upon tripods formed by the precast concrete units. However, at the outside of the silo the tripod is dispensed with in favour of a simple concrete support 74 (see FIGURE 9) in the vertical plane directly beneath the cell wall which would otherwise form one side of the interstitial triangle.

The silo is shown without any exterior cover but this may be readily attached to the cell walls to form external cladding and to the top of the cells to form a roof, in which is contained the necessary conveying equipment.

In the multi-celled silo having octagonal cells the interstitial spaces between the cells are square in section instead of triangular and are supported upon four precast suitably adapted concrete units per square.

What we claim is:

1. A silo having at least three compartment cells identical in section which nest with each other, each compartment cell being formed by a plurality of flat plates forming flat side walls of the cell connected together in a regular geometric pattern whereby polygonal spaces occur at each juncture of adjacent cells, which spaces are defined by pairs of connected plates one of which is common with the plates of adjacent cells respectively, any two cells being separated by a common plate, the plane containing a first plate of each pair of adjacent connected plates cutting the plane containing the second plate of the pair along a line which lies on a marginal portion of said second plate which extends in overlapping manner beyond the edge of said first plate into the polygonal space, connecting members located respectively in each angular recess formed by the first plate and the overlapping marginal portion of said second plate; each connecting member located in the angular recess formed by the marginal portion of said one plate and the extending marginal portion of said adjacent plate being a strip welded to said marginal portions.

2. A silo having at least three compartment cells identical in section which nest with each other, each compartment cell being formed by a plurality of flat plates forming flat side walls of the cell connected together in a regular geometric pattern whereby polygonal spaces occur at each juncture of adjacent cells, which spaces are defined by pairs of connected plates one of which is common with the plates of adjacent cells respectively, any two cells being separated by a common plate, the plane containing a first plate of each pair of adjacent connected plates cutting the plane containing the second plate of the pair along a line which lies on a marginal portion of said second plate which extends in overlapping manner beyond the edge of said first plate into the polygonal space, connecting members located respectively in each angular recess formed by the first plate and the overlapping marginal portion of said second plate; the plates being of steel, and a steel angle member welded to said one plate at one edge along one leg of said angle member, the other leg thereof being bolted flat to the extending marginal portion of the plate adjacent said one plate.

3. A silo according to claim 1 wherein each cell is formed by eight vertical steel plates connected together in an equilateral octagonal configuration whereby square section spaces occur at each juncture of four adjacent cells.

4. A silo according to claim 1, the cells being nested with each other in the manner of a honeycomb, each cell being formed by twelve vertical steel plates connected together in an equilateral duodecagonal configuration, whereby triangular sectioned spaces occur at each juncture of three adjacent cells.

5. A silo having at least three compartment cells identical in section which nest with each other, each compartment cell being formed by a plurality of flat plates forming flat side walls of the cell connected together in a regular geometric pattern whereby polygonal spaces occur at each juncture of adjacent cells, which spaces are defined by pairs of connected plates one of which is common with the plates of adjacent cells respectively, any two cells being separated by a common plate, the plane containing a first plate of each pair of adjacent connected plates cutting the plane containing the second plate of the pair along a line which lies on a marginal portion of said second plate which extends in overlapping manner beyond the edge of said first plate into the polygonal space, connecting members located respectively in each angular recess formed by the first plate and the overlapping marginal portion of said second plate; the cells being nested with each other in the manner of a honeycomb, each cell being formed by twelve vertical steel plates connected together in an equilateral duodecagonal configuration, whereby triangular sectioned spaces occur at each juncture of three adjacent cells; six support members for the vertical plates arranged equally spaced apart on a pitch circle and grouped together in threes in the manner of tripods to support the cells at entablature level, and infill plates arranged alternately between said support members, said support members each having inclined surfaces forming with said infill plates the cell bottom which is in the form of an inverted, truncated hollow pyramid having twelve inclined internal surfaces.

6. A silo according to claim 5, wherein each support member is precast in concrete and comprises the upper inclined portion and a lower inclined portion formed integrally with the upper portion, said upper portion being inclined to the vertical in the opposite sense to that of the lower portion.

7. A silo according to claim 6, wherein the upper portion is inclined to the vertical at an angle of from 30 to 50 degrees and said lower portion is inclined to the vertical at an angle of from 20 to 30 degrees.

8. A silo according to claim 7, wherein the upper inclined portion tapers in width in decreasing dimension from the top downwards, the upper surface having a truncated wedge shape.

9. A silo according to claim 6, wherein a thrust ring is carried by said support members in the region of the juncture of the upper and lower portions of said support members and serves to restrain horizontal forces in this region.

10. A silo according to claim 6, wherein an arcuate steel strip is connected to the bottom ends of side plates common to adjacent cells, the strips and the bottoms of the said side plates common to adjacent cells forming a girdle restraining horizontal bursting forces at entablature level.

11. A silo according to claim 6, wherein three ties, displaced at 120° to each other, are each connected at one end to a connecting member arranged centrally of each tripod formed by three support members and at the other end respectively to the three support members in the region of the juncture of the upper and lower portions of said support members, and ties serving to restrain horizontal forces in this region.

12. A silo according to claim 6, wherein the upper end of each upper inclined portion of the support members is provided with a horizontal support element having a truncated wedge shaped upper surface and vertical side faces inclined to each other at 120° whereby the side faces of adjacent upper ends come into close proximity with each other.

References Cited

UNITED STATES PATENTS

| 699,439 | 1902 | Ballou | 52—237 |
|---|---|---|---|
| 3,077,961 | 2/1963 | Deicke | 287—189.36 |

FOREIGN PATENTS

| 777,879 | 1934 | France. |
|---|---|---|
| 1,035,701 | 1953 | France. |
| 226,885 | 1925 | Great Britain. |
| 609,254 | 1960 | Italy. |

JOHN E. MURTAGH, *Primary Examiner.*